United States Patent
Guennewig

(10) Patent No.: US 10,520,358 B2
(45) Date of Patent: Dec. 31, 2019

(54) SPECTROPHOTOMETER AND METHOD FOR CARRYING OUT A SPECTROPHOTOMETRIC MEASUREMENT

(71) Applicant: Merck Patent GmbH, Darmstadt (DE)

(72) Inventor: Bernhard Guennewig, Geisenfeld (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/536,694

(22) PCT Filed: Nov. 20, 2015

(86) PCT No.: PCT/EP2015/002335
§ 371 (c)(1),
(2) Date: Jun. 16, 2017

(87) PCT Pub. No.: WO2016/096077
PCT Pub. Date: Jun. 23, 2016

(65) Prior Publication Data
US 2017/0350753 A1 Dec. 7, 2017

(30) Foreign Application Priority Data

Dec. 18, 2014 (EP) .................................... 14004292

(51) Int. Cl.
*G01J 1/42* (2006.01)
*G01J 3/28* (2006.01)
*G01J 3/42* (2006.01)

(52) U.S. Cl.
CPC ............... *G01J 1/4204* (2013.01); *G01J 3/28* (2013.01); *G01J 3/2803* (2013.01); *G01J 3/42* (2013.01)

(58) Field of Classification Search
CPC .................................. G01J 1/4204; G01J 3/28
See application file for complete search history.

(56) References Cited

U.S. PATENT DOCUMENTS

| 4,279,510 A | 7/1981 | Brown |
| 5,303,027 A | 4/1994 | Kuderer |
| 2013/0306839 A1* | 11/2013 | Kuwabara ................. G01J 1/46 250/206 |

FOREIGN PATENT DOCUMENTS

| EP | 519105 A1 | 12/1992 |
| EP | 1750106 A1 | 2/2007 |

OTHER PUBLICATIONS

International Search Report PCT/EP2015/002335 dated Feb. 17, 2016.
Machine translation of EP1750106A1 published Feb. 7, 2007 to Haase Barbara of Hach Lange Gmbh.

* cited by examiner

*Primary Examiner* — Michael C Bryant
(74) *Attorney, Agent, or Firm* — Millen, White, Zelano & Branigan, P.C.; William Nixon

(57) ABSTRACT

The present invention relates to a spectrophotometer comprising a light source; and a light sensor for measuring the light emitted by the light source and passing through or reflected a sample; and being characterized by an offset generator for applying an offset value to an output of the light sensor. The invention further relates to a method for performing a related spectrophotometric measurement.

13 Claims, 7 Drawing Sheets

SPECTROPHOTOMETER AND METHOD FOR CARRYING OUT A SPECTROPHOTOMETRIC MEASUREMENT

The present invention relates to the field of spectrophotometric measurements. More specifically, it relates to a device for carrying out correct spectrophotometric measurements even in the presence of ambient light disturbing the measurement. Even more specifically, the invention relates to a spectrophotometer comprising a light source and a light sensor for measuring the light emitted by the light source after it passed through a sample.

Spectrophotometric measurement is a technique comprising having a light source, potentially with a specific power and/or wavelength, illuminating a sample, measuring the transmitted or reflected light by means of a light detector, and deriving characteristic of the sample based on its absorption of light. This is made possible by knowing the intensity of light at the source and measuring the intensity of light at the detector.

However, in a laboratory, it is often difficult to detect only the light from the sample. In practice, the environment is often illuminated by some ambient light, comprising natural light or artificial light or a combination of both. This ambient light is added to the light source of the spectrophotometric device.

This creates a problem, as the light received at the detector is not only a function of the light source of the spectrophotometer, but a combination of the latter with the unknown ambient light. Thus, in the presence of ambient light, it is not possible to determine how much light has been absorbed or reflected by the sample.

One possible solution to this problem comprises blocking the ambient light, for instance by means of a lid. This ensures that the amount of light being input into the sample is known. This solution is however complicated, as a light-tight lid is not easy to realize and maintain. It is furthermore forcing the operator to open the lid, place the sample, close the lid, and perform the measurement, thus significantly slowing down the measuring process.

One alternative solution comprises a spectrophotometer which can take multiple measurements. A first measurement is performed with the light source of the spectrophotometer turned off. The detected light is then recorded as a first value, being a function of the ambient light only. A second measurement is performed with the light source of the spectrophotometer turned on. This results in a second value being a function of the ambient light and of the light source of the spectrophotometer. The subtraction of the first value from the second value provides the result of the spectrophotometric measurement, that is, a measurement based on the known light from the light source of the spectrophotometer.

However, even the latter solution is not ideal, presenting at least two drawbacks.

A first drawback concerns the fact that it is assumed that the ambient light does not change between the first and second measurement. If the ambient light changes, the result of the subtraction of the first value from the second value is not a function of the spectrophotometric light source only, but also a function of the change of ambient light between the two measurements. This results in an imprecise or incorrect measurement.

A second drawback is related to the different intensities of the spectrophotometer's light source and of the ambient light. In particular, the power of the spectrophotometer's light source can be quite low compared to the power of the ambient light, sometimes up to two orders of magnitude, or even more. Therefore, the detecting portion of the spectrophotometer must be capable of operating with the strong light intensity deriving from the sum of the ambient and spectrophotometer's light source, with nevertheless the precision required for detecting the small portion of light absorbed or reflected by the sample.

For instance, assuming a relative intensity of 1 for the spectrophotometer's light source, and a relative intensity of 100 for the ambient light, the detecting portion of the spectrophotometer must be capable of handling the total intensity value of 101. Nevertheless, since it is only the light coming from the spectrophotometer's light source that must be analyzed, the detecting portion of the spectrophotometer must also be precise enough to detect the small difference in the relative intensity of 1, due to the sample's absorption or reflection. This requires complicated and expensive electronics, capable of handling large values while retaining a high precision.

Having identified the above issues with known spectrophotometers, a new spectrophotometric device has been developed, advantageously operating, even in the presence of a strong ambient light, in a precise and reliable manner.

It is the general approach of the present invention to provide an analog offset generator which offsets the output of the light sensor by an amount corresponding to the actual ambient light or average ambient light. Thanks to this approach, it is possible to reduce the amplitude of the signal to be analyzed by the components of the spectrophotometer connected after the light sensor. In this manner, less complicated and less expensive electronic circuits can be used in order to implement those components. Alternatively, or in addition, since the amplitude of the signal is reduced, components having a lower resolution can be employed, thus resulting in an improved precision of the spectrophotometer.

SUMMARY OF THE INVENTION

The invention aims to provide an apparatus and a method for carrying out an improved spectrophotometric measurement by means of a spectrophotometer.

This object is solved by the subject matter of the independent claims. The subject matter can relate to a spectrophotometer, comprising a light source; and a light sensor for measuring the light emitted by the light source and passing through or reflected by a sample; characterized by an analog offset generator for applying an offset value to an output of the light sensor. Thanks to this approach, an offset based on the ambient light can be applied to the output of the light sensor. In this manner, the amplitude of the signal to be analyzed by the components of the spectrophotometer connected after the light sensor is reduced, this allowing use of less complicated and less expensive electronic circuits in order to implement those components. Alternatively, or in addition, since the amplitude of the signal is reduced, components having a lower resolution can be employed, thus resulting in an improved precision of the spectrophotometer.

In some embodiments, the offset value can have an absolute value corresponding to ambient light from the environment of the spectrophotometer. Thanks to this approach, the entire influence of the ambient light can be removed, thus advantageously letting the spectrophotometer precisely operate on the light from the light source.

In some embodiments, the offset generator can further comprise an integrator having an input connected to the light sensor. Thanks to this approach, the amount of light collected from the light sensor can be measured.

In some embodiments, the offset generator can further comprise a memory element, for example a sample-and-hold element, and wherein an output of the integrator can be connected to the memory element or sample-and-hold element. Thanks to this approach, the memory element or sample-and-hold element, can be used to freeze a feedback loop which controls the offset value during the spectrophotometric measurement.

In some embodiments, the offset generator can further comprise a low-pass filter and an output of the integrator can connected to the low-pass filter. Thanks to this approach, the light generated by the light source can be filtered out by the low-pass filter, by providing a frequency of the light source which is too high to pass through the low-pass filter. In this manner, the feedback loop can keep operating even while the measurement is ongoing, since the light from the measurement is filtered out by the low-pass filter, inserted in the feedback loop. For example, if the time constant of the low-pass filter is chosen such that the duration of a light pulse from the light source is too short for the light pulse to pass through the low-pass filter, switching in the feedback loop is not required. As there are neither switch-over times nor switching effects, the light source may provide flash light pulses, that may appear after somewhat varying delay times. Further, as a switching element or sample-and-hold element is not required, the number of components may be reduced.

In some embodiments, the offset generator can further comprise an Analog-to-Digital converter, coupled to the integrator for converting an analog signal into a digital signal, a processor, coupled to the Analog-to-Digital converter, for processing the digital signal and calculating a digital offset signal. The offset generator may further comprise a Digital-to-Analog-Converter, coupled to the processor, for converting the digital offset signal into the offset value. Thanks to this approach, the offset value may be swiftly calculated. As the feedback loop is much faster, the light source may provide halogen light. Further, as the processor may take into account predetermined data, control may be improved.

In some embodiments, the offset generator can further comprise a regulator, and the output of the integrator can be connected to a first input of the regulator. Thanks to this approach, the regulator can be used in the feedback loop for ensuring the offset value is stabilized at a predetermined value, even when the ambient light changes.

In some embodiments, an output of the memory element or sample-and-hold element, or low-pass filter, processor or DAC can be connected to the first input of the regulator. Thanks to this approach, the feedback loop can keep tracking of the ambient light, thanks to the regulator, while being capable of excluding from the feedback loop signals having a high frequency, such as flash light pulses, or excluding signals from the feedback loop during by outputting a value stored in the memory prior to the measurement.

In some embodiments, the regulator can comprise a second input, connected to an initial level signal, wherein the regulator can control its output so as to minimize the difference between its two inputs. Thanks to this approach, the amount of ambient light to be removed from the output of the light sensor can be controlled by controlling the value of the initial level signal.

In some embodiments, the offset generator can further comprise a current generator, and the output of the integrator can be connected to the current generator. Thanks to this approach, the offset value can be applied simply by applying a current to the output of the light sensor. This is advantageous as most light sensors have an output expressed as a current value. This is particularly the case for photodiodes, which are commonly used as light sensors.

In some embodiments, the output of the integrator can be connected to the current generator through the memory element or sample-and-hold element and the regulator. Thanks to this approach, the respective advantages of the integrator, current generator and the memory element or sample-and-hold as described above can be obtained in a single device.

Further, the present invention can relate to a method for carrying out a spectrophotometric measurement by means of a spectrophotometer comprising a light source, a light sensor, and an offset generator, comprising: an ambient light evaluation step, including measuring the ambient light by means of the light sensor, with the light source being turned off or shaded off; a measurement step, including measuring the ambient light by means of the light sensor, while the light source is turned on or not shaded off and while applying an offset value to the output of the light sensor. Thanks to this approach, the ambient light can be evaluated with the light source being turned off or shaded off and a corresponding offset applied to the output of the light sensor while the light source is turned on or it is not shaded. In this manner, the amplitude of the signal to be analyzed by the components of the spectrophotometer connected after the light sensor is reduced, this allowing use of less complicated and less expensive electronic circuits in order to implement those components. Alternatively, or in addition, since the amplitude of the signal is reduced, components having a lower resolution can be employed, thus resulting in an improved precision of the spectrophotometer.

Further aspects include a computer program, computer program product or non-transitory computer-readable medium storing a program causing a computer to execute one of the methods. The computer comprises, for example, a processor executing one of the methods and memory such as volatile memory or non-volatile memory storing instructions implementing the steps and parameters.

All of the above aspects may be combined and each aspect may include one or more features mentioned in connection with any of the other aspects.

BRIEF DESCRIPTION OF DRAWINGS

While the specification concludes with claims particularly pointing out and distinctly claiming that which is regarded as the invention, a more particular description of the invention will be rendered by reference to specific embodiments thereof, which are depicted in the appended figures. It is understood that the figures depict only typical embodiments of the invention, that are not necessarily drawn to scale, and, therefore, are not to be considered limiting of its scope. Embodiments will be described and explained with additional specificity and detail through use of the accompanying figures in which equal reference numerals correspond to equal components and in which:

DETAILED DESCRIPTION OF THE INVENTION

Figure 1:
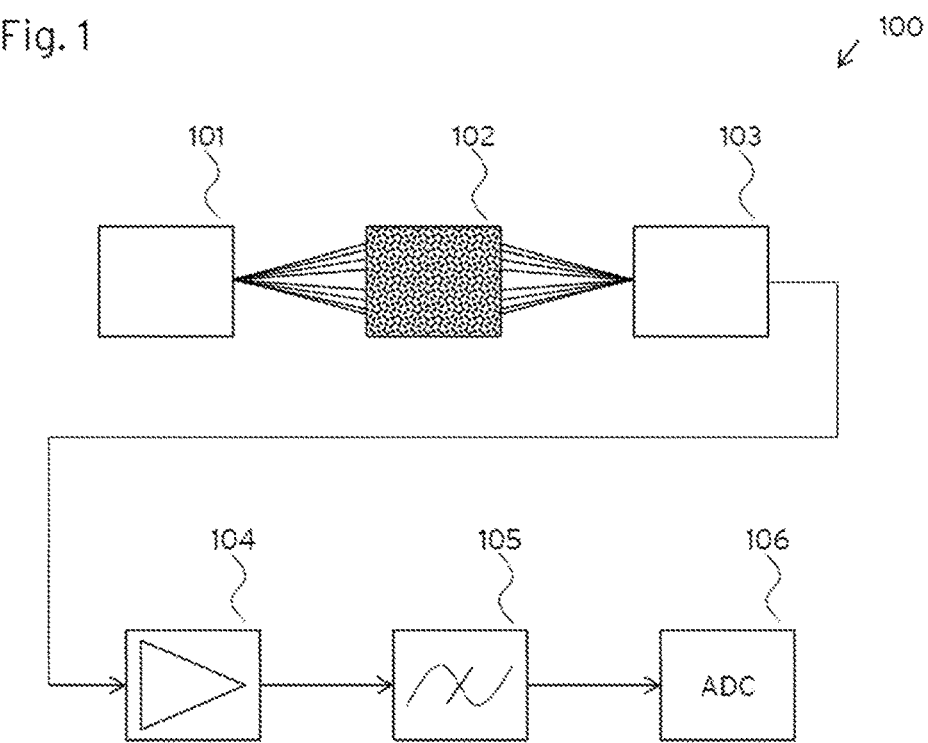
FIG. 1 schematically illustrates a spectrophotometer 100 according to the state of the art.

In the detailed description of the embodiments, reference is made to the accompanying figures which show, by way of illustration, specific embodiments in which the invention may be practiced. In order to show the structures of the embodiments most clearly, the figures included herein are a diagrammatic representation of inventive articles. Thus, actual appearance of the fabricated structures may appear different while still incorporating essential structures of embodiments. Moreover, the figures show only the structures necessary to understand the embodiments. Additional structures known in the art have not been included to maintain clarity of the figures. It is also to be understood, that features and/or elements depicted herein are illustrated with particular dimensions relative to one another for purposes of simplicity and ease of understanding, and that actual dimensions may differ substantially from that illustrated herein. In the figures, like numerals describe substantially similar components throughout the several views. The embodiments are intended to describe aspects of the invention in sufficient detail to enable those of skill in the art to practice the invention. Other embodiments may be utilized and structural, logical or electrical changes or combinations thereof may be made without departing from the invention.

Moreover, it is to be understood, that the various embodiments of the invention, although different, are not necessarily mutually exclusive. For example, a particular element, feature, structure, characteristic, integer or step, or group of elements, features, structures, characteristics, integers or steps described in one embodiment may be included within other embodiments. Furthermore, it is to be understood, that embodiments of the invention may be implemented using different technologies. Also, the term "exemplary" is merely meant as an example, rather than the best or optimal. The detailed description is, therefore, not to be taken in a limiting sense.

Throughout this specification the word "comprise" or variations such as "comprises" or "comprising", will be understood to imply the inclusion of a stated element, integer or step, or group of elements, integers or steps, but not the exclusion of any other element, integer or step, or group of elements, integers or steps. In the description and claims, the terms "include", "have", "with" or other variants thereof may be used. It is to be understood, that such terms are intended to be inclusive in a manner similar to the term "comprise".

In the description and claims, the term "connected" does not imply a direct connection. For instance, the sentence "element A is connected to element B" is to be interpreted so as to mean that those two elements are either directly connected, or are connected through other elements. It will be appreciated, by those skilled in the art of electronics, that this is a common interpretation of the term "connected", as it allows a clear explanation of how the signals are propagated, without having to describe each single component in between (i. e. even a simple resistor), in detail.

Figure 1A:
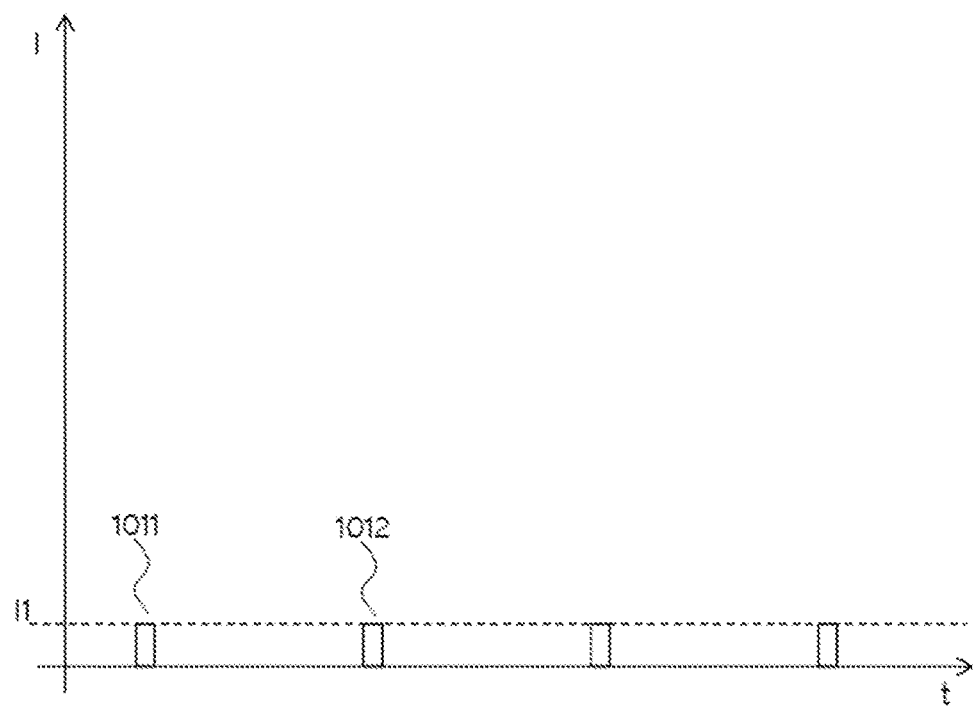
FIGS. 1A-1C schematically illustrate exemplary signals at different stages of the spectrophotometer 100.
Figure 1B:
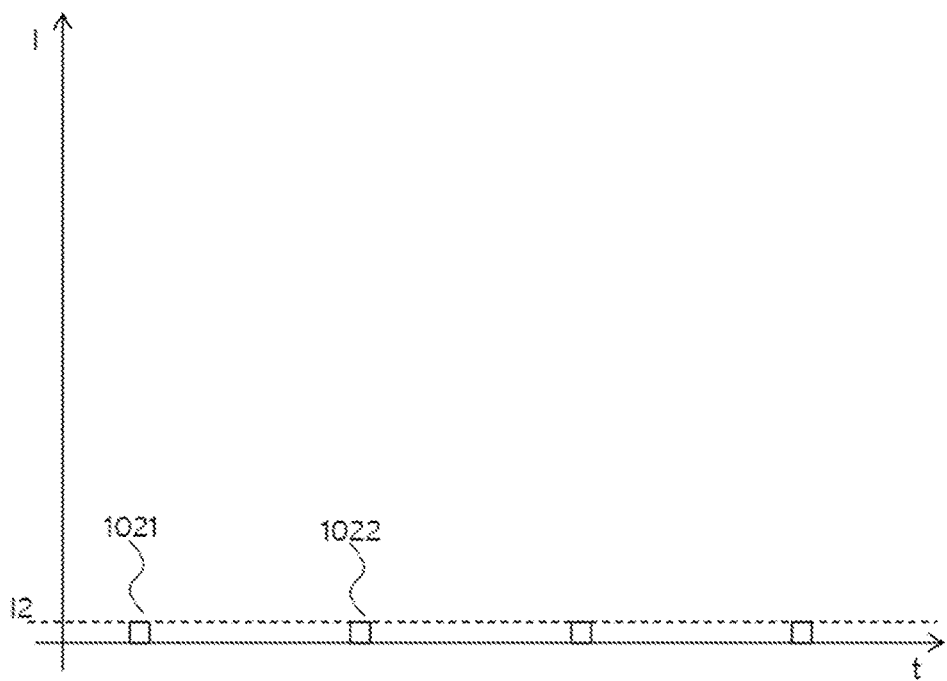
Figure 1C:
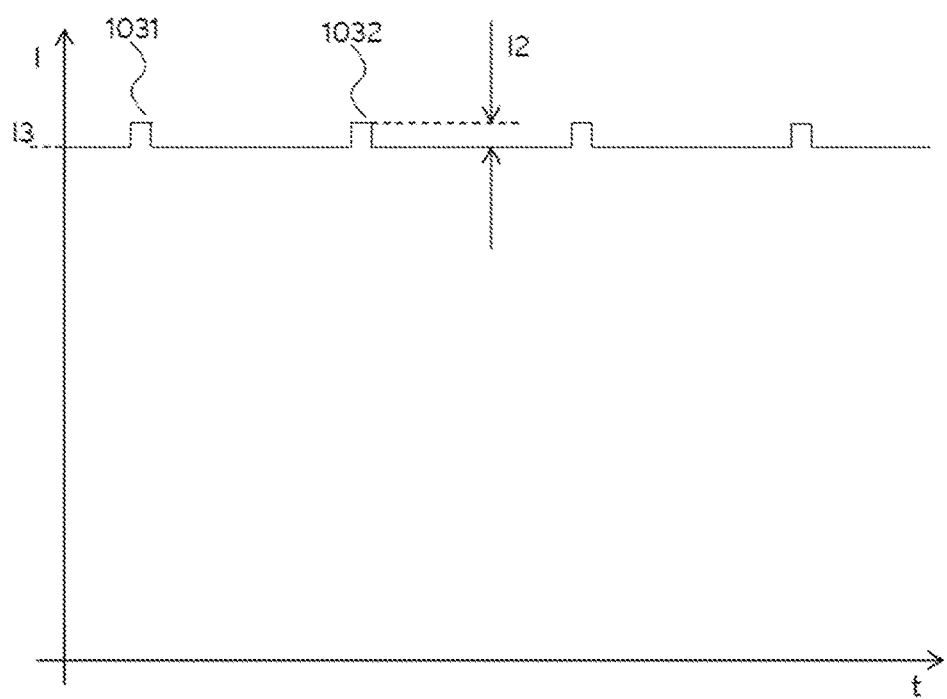

FIG. 1 schematically illustrates a spectrophotometer 100 according to the state of the art. In particular, spectrophotometer 100 comprises elements 101 and 103-106, element 102 being the sample to be analyzed. FIGS. 1A-1C schematically illustrate exemplary signals at different stages of the spectrophotometer 100.

A light source 101 of the spectrophotometer 100 can be, for instance, a monochromatic light source. The light source 101 may be implemented as a light emitting diode (LED), for example. Light source 101 generates pulses 1011, 1012, etc., as shown in FIG. 1A. The pulses result in a signal value I1 in the range of small microamperes (microamps, µA) and a duration in the range of 0.2 µs to 5 µs such as 1 µs, for example.

The light pulses 1011, 1012, etc. may, as indicated in FIG. 1, cross the sample 102, which absorbs at least partially the intensity of the pulses, resulting in the signal of FIG. 1B at the exit of sample 102. Here, pulses 1021 and 1022 result from pulses 1011 and 1012, respectively, having passed through the sample 102. An exemplary sample can reduce the signal by 4-5 absorbance factors of the incoming light from light source 101, resulting in pulses 1021 and 1022 having an exemplary intensity I2 in the range of nanoamperes (naneamps, nA) or even in the range of hundreds of picoamperes (picoamps, pA).

The light intensity received at a light sensor 103 of the spectrophotometer 100 does not, however, contain only the signal illustrated in FIG. 1B. Owing to the absence of a lid, the light received at the light sensor 103 is a combination of the pulses 1021, 1022, etc., with an ambient light, illustrated by intensity I3 in FIG. 1C. This results in a signal comprising pulses 1031, 1032, etc. The intensity I3 of the ambient light, as illustrated in FIG. 1C, is generally substantially higher that the intensity I1 of the light source 101, and can be, for instance, in the range of hundreds of microamperes.

This complicates the subsequent elements 104-106 of the spectrophotometer 100.

In particular, an amplifier 104 amplifies the signal of FIG. 1C, a filter 105 filters the amplified signal and an Analog-to-Digital Converter (ADC) 106 digitalizes the filtered signal. All those elements are required to operate on a signal having an amplitude equivalent to I2+I3, while still retaining enough precision for discerning the difference between I1 and I2. This complicates the corresponding electronic circuits, since electronic circuits with a wide input range and high precision are complicated and expensive to realize. This problem is solved by the embodiments of the invention, described below.

Figure 2:
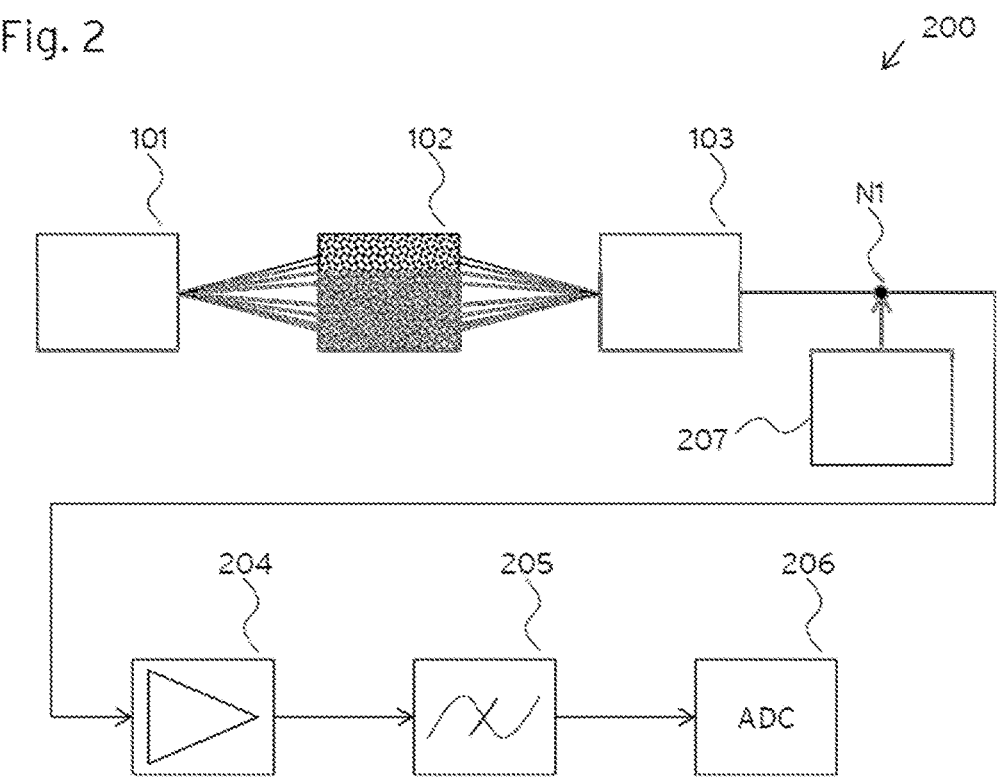
FIG. 2 schematically illustrates a spectrophotometer 200 according to an embodiment of the invention.
Figure 2A:
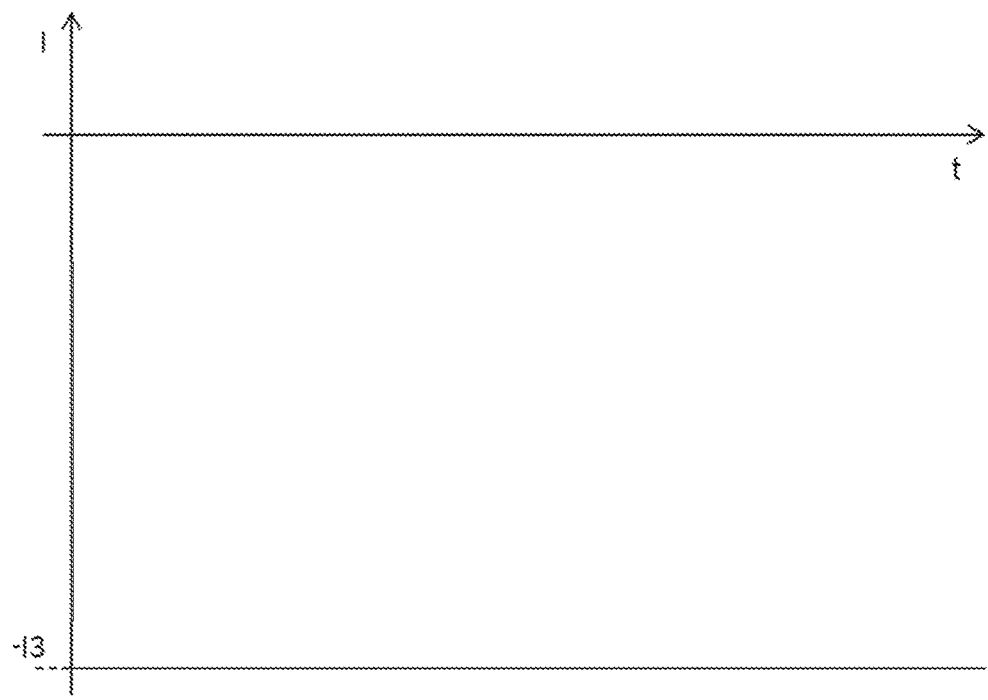
FIGS. 2A-2C schematically illustrate exemplary signals at different stages of the spectrophotometer 200.
Figure 2B:
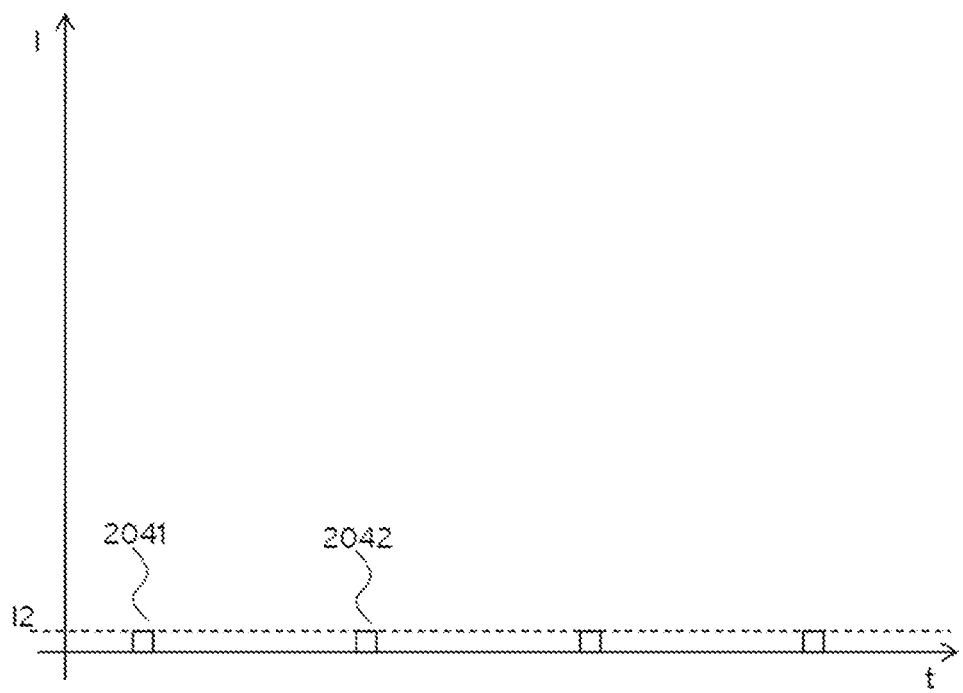
Figure 2C:
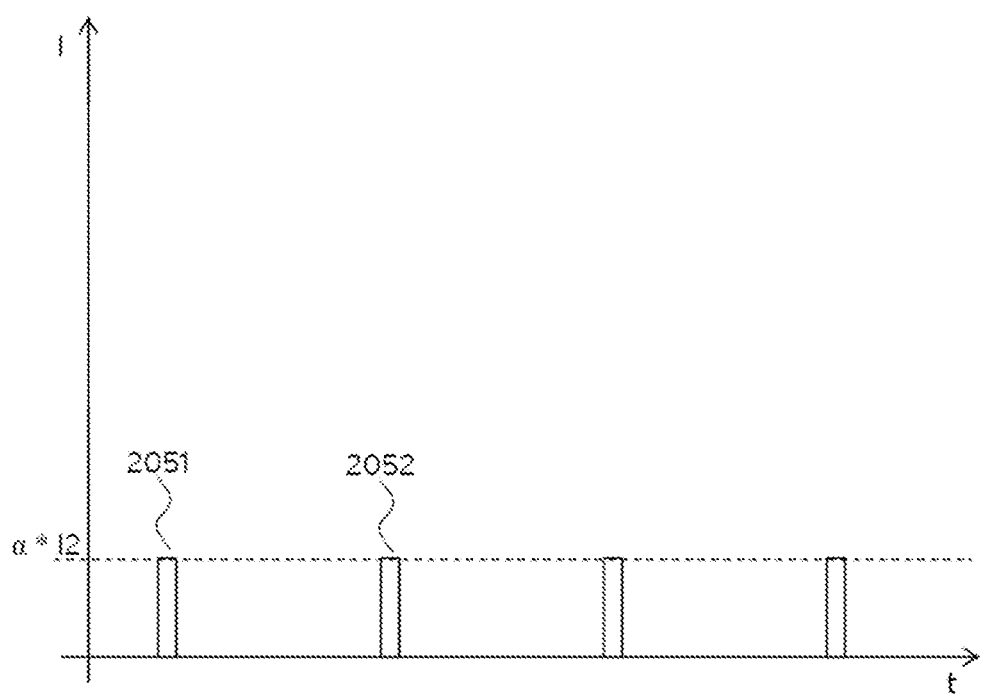

FIG. 2 schematically illustrates a spectrophotometer 200 according to an embodiment of the invention. In particular, spectrophotometer 200 comprises elements 101, 103 and 204-207, element 102 being the sample to be analyzed. FIGS. 2A-2C schematically illustrate exemplary signals at different stages of the spectrophotometer 200.

Generally, elements 101 and 103, namely the light source and the light sensor, correspond to the respective elements of spectrophotometer 100. However, the output of light sensor 103 is connected to an analog offset generator 207 at node N1. This simplifies the operation of elements 204-206, which have a function similar to respective elements 104-106, while having less stringent specifications.

In particular, offset generator 207 is an element which is capable of applying an offset to the signal output by light sensor 103, having a value corresponding to the intensity I3 of the ambient light, with an opposite sign. The signal output by offset generator 207 is illustrated in FIG. 2A, having a value equal to −I3.

The signal at the input of amplifier 204, that is, node N1, is illustrated in FIG. 2B. The signal comprises pulses 2041, 2042, etc., resulting from pulses 1011, 1012, etc., after passing through sample 102. In particular, owing to the compensation of the ambient light by means of offset generator 207, the pulses have an intensity corresponding to I2. The output of amplifier 204 is illustrated in FIG. 2C, where the pulses 2051, 2052, etc., have an amplitude equal to α*I2, where α is the amplification coefficient. The amplification of the signal, which is optional, can facilitate the operation of the subsequent elements 205 and 206.

Filter 205, which is optional, filters the signal being output by amplifier 204, so as to provide a stable signal to ADC 20. ADC 206, also being optional, then converts the output signal of filter 205 into an output digital signal representative of the intensity I2. Thanks to this, a difference can be calculated between I1 and I2, thus allowing identification of the sample 102.

It will be clear to those skilled in the art that, although elements 204-207 have been described, the present invention does not necessarily comprise those elements. In a more basic implementation, the output of light sensor 103 and offset generator 207, representative of intensity value I2, could be directly subtracted, in an analog or digital manner, from the known value of I1, resulting in the output, either analog or digital, of the spectrophotometer 200.

In specific implementations, offset generator 207 could comprise a voltage generator, if the output of the light sensor 103 is expressed as a voltage signal, or a current generator, if the output of the light sensor 103 is expressed as a current signal.

In further specific implementations, the offset generator 207 can provide an output value corresponding to the ambient light intensity I3 by using another light sensor (not shown), positioned in such a manner so as to receive ambient light, but not light from light source 101. This can be achieved, for instance, by having a directional light sensor oriented toward a direction not including the light source 101, for instance by mounting the other light sensor on the external body of the spectrophotometer. This has the advantage that the compensation, carried out by the offset generator 207, can track any change of the ambient light I3, independently on the duration of the measurement by the spectrophotometer 200.

In further specific implementations, the output of light sensor 103 could be input into offset generator 207 before light source 101 is turned on. This advantageously eliminates the need for another light sensor. In this case, the offset generator 207 could comprise a memory, for storing the value I3 outputted by the light sensor 103 prior to the turning on of light source 101. In a similar manner, the input to the offset generator 207 could be taken from the output of any of elements 204-206 which, when the light source 101 is turned off, output a signal corresponding to the intensity I3 of the ambient light.

It will be clear to those skilled in the art that, while reference is generally made to the intensity of a light signal, this can refer to both the actual physical intensity of a light signal, or to an electric signal, representing the physical intensity of the light signal. For instance, while the signal of FIG. 2B can be better thought of illustrating the light passing through sample 102, the signal of FIG. 2C, being output by an electric circuit, can be better thought of an electric signal, being it voltage or current, having a value representing the light captured by sensor 103. It will be clear that this has been done in view of ease or description, and in view of the fact that, to a skilled person, the conversion of a light signal into an electric signal representation is a matter or common general knowledge.

Figure 3:
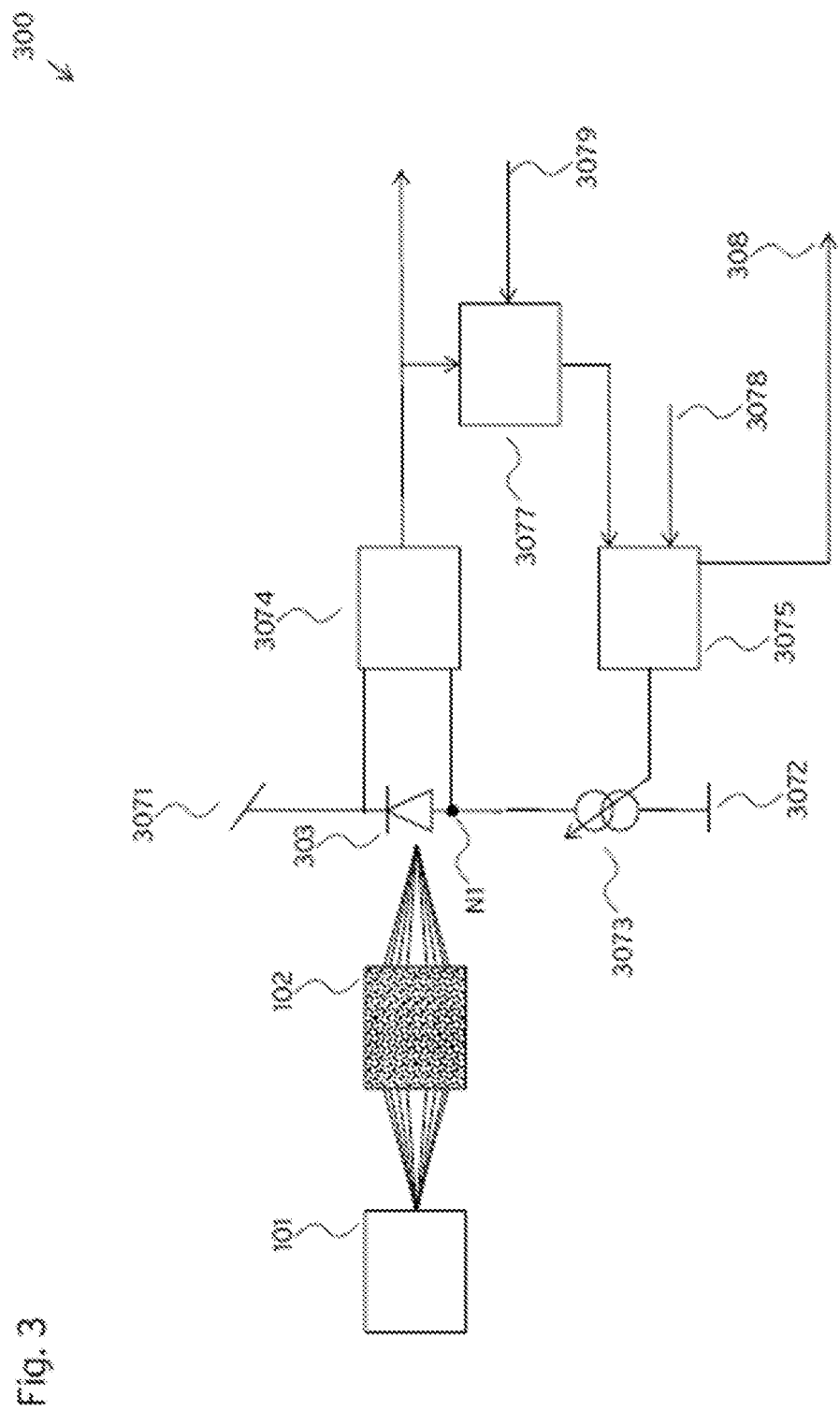
FIG. 3 schematically illustrates a spectrophotometer 300 according to another embodiment of the invention.

FIG. 3 schematically illustrates a spectrophotometer 300 according to another embodiment of the invention. In particular, spectrophotometer 300 is based on spectrophotometer 200, where one of several possible detailed implementations of analog offset generator 207 is described.

More specifically, in the spectrophotometer 300, the offset generator 207 is implemented as a current generator 3073, potentially in combination with an integrator 3074, and/or a regulator 3075 and/or a memory element 3077, while the light sensor 203 is implemented as a photodiode 303.

The photodiode 303 is connected in series to the current generator 3073 at node N1, between a high voltage terminal 3071 and a low voltage terminal 3072. In this manner, the photodiode 303 generates a current proportional to the incoming light signal. Current generator 3073 generates a current based on the input provided by regulator 3075. The current resulting from the difference of the current generated by the photodiode 303 and the current generator 3073 is input to integrator 3074. In this manner, as it will be explained below, an offset is applied to the output of the photodiode 303, reducing the signal amplitude to be analyzed by the regulator 3075 and/or any subsequent signal processing element. This allows the present invention to operate in a precise manner, without complex electronic circuitry, even in the presence of ambient light. Moreover, it allows the invention to operate without using a light-tight lid, or without having to perform multiple measurements of the sample 102.

The operation of spectrophotometer 300 will now be described.

At the beginning of operation of the spectrophotometer 300, an optional reset operation results in the integrator 3074 providing a value of zero or substantially zero as its output. The output of integrator 3074 is then relayed, through memory element 3077, potentially a sample-and-hold element, to regulator 3075. At this point, memory element 3077 operates substantially like a pass-through device, letting the signal on its input to be relayed to its output. The other input of regulator 3075 is connected to an initial level signal 3078, which can be a predetermined level, for instance zero, or can be input by an operator.

After this, the integrator is left free to integrate the current generated from photodiode 303. Since, at this point in time, light source 101 is turned off, the photodiode 303 provides an output signal equivalent to the ambient light I3. This signal is integrated by integrator 3074, which provides an input signal to memory element 3077. As memory element 3077 is still operating as a pass-through element, the signal is relayed to regulator 3075, which controls current generator 3073, thereby realizing a feedback loop. After a given stabilization time, the feedback results in the current generator 3073 outputting a current which has a value, that is, the offset value, such that the difference between the two inputs of the regulator is minimized. In other words, the feedback loop operates so as to bring the output of the integrator 3074 to a value corresponding to substantially the initial level signal 3078.

At this point the spectrophotometer 300 is in a compensated mode, and ready for measurement. The light source 101 is thus turned on, while, at substantially the same time, a switch in ongoing-measurement signal 3079 forces the memory element 3077 to output a value to the regulator 3075 corresponding to the value of its input at the moment of switching of ongoing-measurement signal 3079. The ongoing-measurement signal 3079 thus acts as a control input of memory element 3077.

It should be noted that, in some embodiments, the ongoing-measurement signal 3079 can be advantageously operated together with the control signal of the light source 101. Alternatively, on in addition, the ongoing-measurement signal 3079 can be switched prior to the turning on of light source 101, so as to ensure that the compensation current generated by current generator 3073 is not influenced by any amount of current from light source 101. Thus, in the above described implementation, the feedback loop is frozen by means of memory element 3077. However, the invention is not limited to this implementation. In alternative embodiments, the feedback loop can be frozen by using a low-pass filter, preferably at least a second-order low-pass filter, a digital-to-analog converter if the output of the integrator is digital, or any other suitable mean for ensuring that the feedback loop is frozen during the spectrophotometric measurement.

In particular, by using a low-pass filter instead memory element 3077, short pulses durations, typical for instance for flash lights, are filtered out of the feedback loop. In this manner, the feedback look is capable of following the evolution of the ambient light, though its bandwidth doesn't allow the light being generated in short impulses by a flash light as light source 101 to pass through the filter, and instead this light is integrated and measured by the spectrophotometer.

Alternatively, the feedback loop may comprise an ADC, coupled to the integrator 3074 for converting the signal output by the integrator from analog into digital form, a processor, coupled to the ADC, for processing the converted signal and calculating a control signal. The processed signal may be used to control the current generator 3073 directly. Alternatively, the feedback loop may further comprise a Digital-to-Analog-Converter (DAC), coupled to the processor and the current generator 3073, for converting the processed signal back into analog form. Owing to processing in the digital format, a residual current causes the integrator 3074 to drift in a positive or negative direction. The processor may calculate the control signal by evaluating the output slew rate of the integrator 3074 in combination with different set DAC values. The processor may take predetermined data being stored in the processor into account. Two integration measurements are performed with the evaluated DAC values: one with the light pulse switched off and one with the light pulse switched on. The start value of the integrator 3074 is about the same for both measurements. Thus, the DAC value brings the output value of the integrator 3074 to the same start point, so that the exact output value at the start does not matter.

During the measurement, the photodiode 303 outputs a signal corresponding to I3+I2. On the other hand, assuming the initial value 3078 is set at zero, the current generator 3073 outputs a signal corresponding to I3, with a direction opposite to the current generated by the photodiode 303, thus making it possible for the integrator 3074 to integrate the current corresponding to I2 only, namely the current carrying the information on the sample 102.

The signal output by the integrator 3074 is potentially further elaborated by any of an amplifier 204, and/or filter 205 and/or ADC 206, resulting in an output representative of the value I2, in the desired analog or digital form.

After the light source 101 is turned off, the ongoing-measurement signal 3079 is switched again, to indicate that no measurement is ongoing and the memory element 3077 can be put again into a transparent, or pass-through, mode. In this manner, the signal coming from integrator 3074 is relayed again to regulator 3075. Should the value of I3 have been changed during the measurement, this allows the spectrophotometer 300 to re-calibrate itself to the new ambient light, prior to taking another measurement. Advantageously, in this operation, the ongoing measurement signal 3079 and the light source 101 can be operated with the same timing, thus simplifying the corresponding driving circuitry.

It should be noted that while reference is made, in the description, to the light being turned off or turned on, a similar effect can be achieved by, respectively, shading or not shading the light source 101, for instance by means of a light-tight cover or barrier or any element capable of blocking light from the light source 101 in the direction of the photodiode 303. Advantageously, this could be obtained, for instance, by a rotating disc, having shaded and transparent areas. This provides the additional advantage that, by appropriately controlling the amount of shaded and transparent areas, and/or by controlling the rotational speed of the disc, light pulses can be obtained with a duration potentially shorter than the duration of the shortest light pulse that can be generated by the light source 101. This allows the present invention, for instance, to generate short light pulses even with lights not usually operating at such short periods, such as a flash light.

Optionally, the regulator 3075 comprises an overdrive output 308, which indicates when the regulator 3075 is in an overdrive mode. That is, if the regulator cannot regulate current generator 3073 such that the two inputs of the regulator assume the same value. This means that the ambient light is too strong for the current generator 3073 to compensate it, and thus a corresponding warning signal, overdrive output 308, is used to inform the user, for instance by relaying the signal to a blinking LED, or similar.

Advantageously, the embodiments of the present invention can also operate in the presence of a non-stable ambient light, as it will be described below. This is relevant in practice since ambient light can contain light sources which are not stable over time.

Figure 4A:
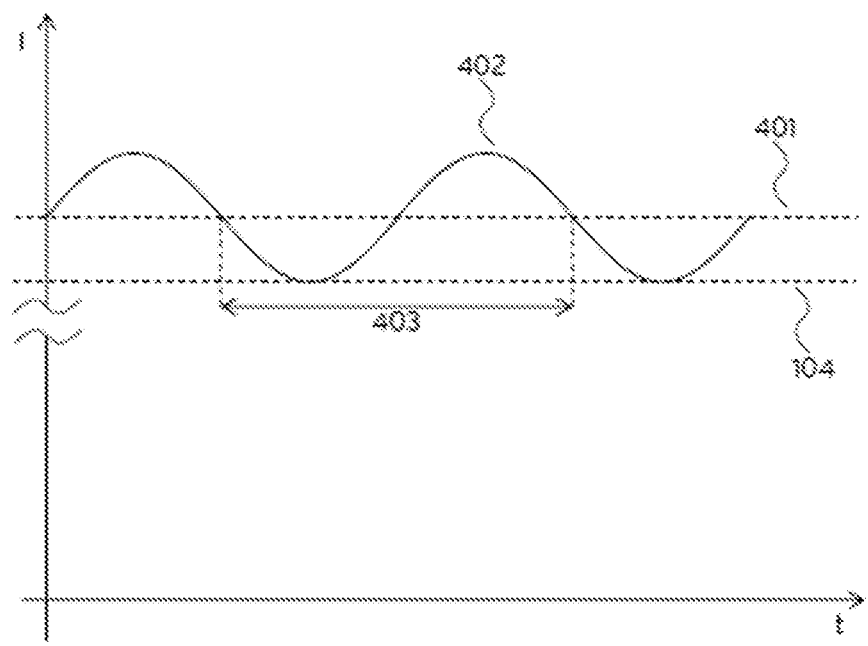
FIGS. 4A-4D illustrate an exemplary time evolution of the light intensity I of a lamp powered by alternating current.

In particular, FIG. 4A schematically illustrates an exemplary time evolution of the light intensity I of a lamp powered by alternating current.

To the human eye, the lamp has a stable intensity. At the millisecond scale, however, this is not true. More specifically, since the lamp is provided with a pulsating power supply, its output is also pulsating as illustrated by curve 402. For instance, the AC power supply can have a sine wave having a frequency of 50 Hz. Thus, when supplied to a filament lamp (light bulb), this AC power results in flicker having a frequency of 100 Hz. The light output by the lamp has, therefore, peaks at this frequency, which result in a period 403 of 10 ms. The peaks, as illustrated, may have a positive offset 404 with respect to the zero level of intensity I. This is due to the fact that the lamp may not turn completely off, even when the AC power reaches its periodical zero value, but may remain on even at this time. For instance, in the case of a classic filament lamp, this may due to the thermal inertia of the filament, which remains hot and emits light, even when the instantaneously supplied power is equal to zero. An average value 401 of the ambient light intensity I results from the integral of the curve 402.

Figure 4B:
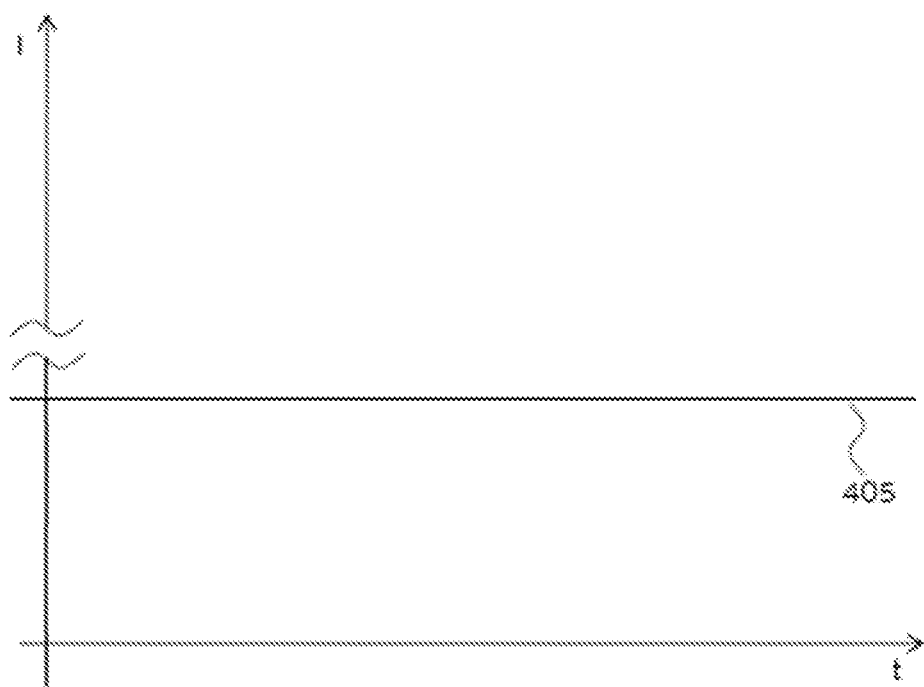

In a practical environment, however, ambient illumination may usually not be provided by a single lamp, but rather a combination of such lamp with some further ambient light sources. The latter may be, for instance, sunlight, or the combination of several other lamps. At the time scale illustrated in FIG. 4A, this additional ambient light effectively results in a stable component 405, illustrated in FIG. 4B, having the same time scale of FIG. 4A. The combination of the light sources of FIGS. 4A and 4B results in the total ambient light, illustrated in FIG. 4C, having the same time scale of FIG. 4A, where the alternating component of curve 402 is maintained in its shape, though its new average 406 corresponds to the sum of values 401 and 405.

In practical conditions, considering the average value 406 to correspond to a reference unit, the peaks of curve 402 oscillate within an alternating range 407. It will be clear to those skilled in the art that the above numerical values are not to be considered as limiting the present invention, but have been provided for illustrating one of many environments in which the invention can operate.

Figure 4C:
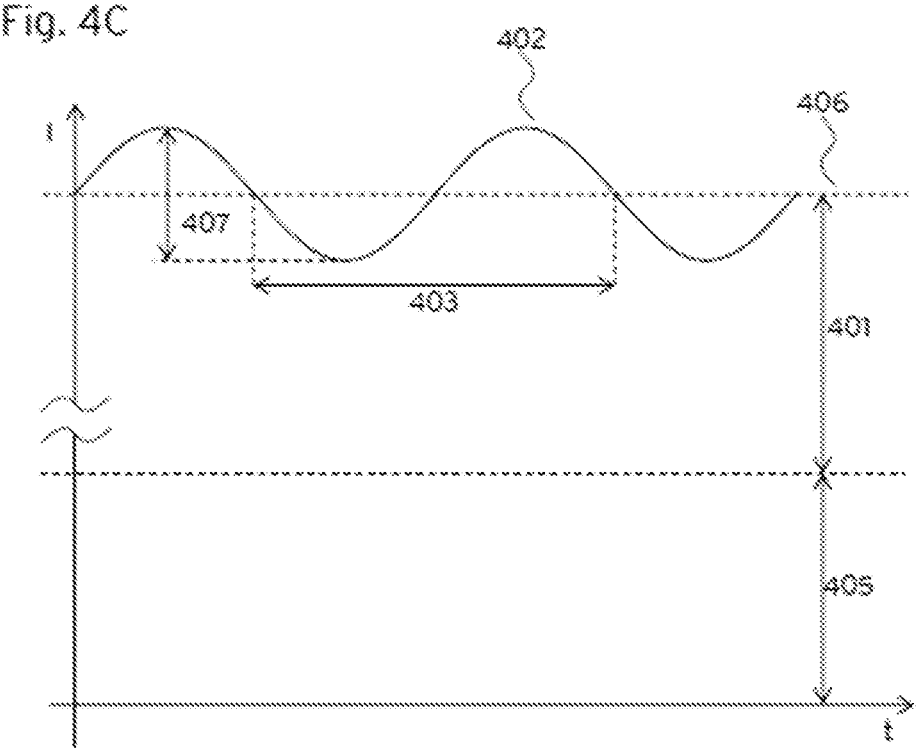

From the ambient light thus described in FIG. 4C, it can be computed how much the ambient light changes, during a given interval. From this, it is possible to estimate how much the change in ambient light impacts the spectrophotometric measurement.

Figure 4D:
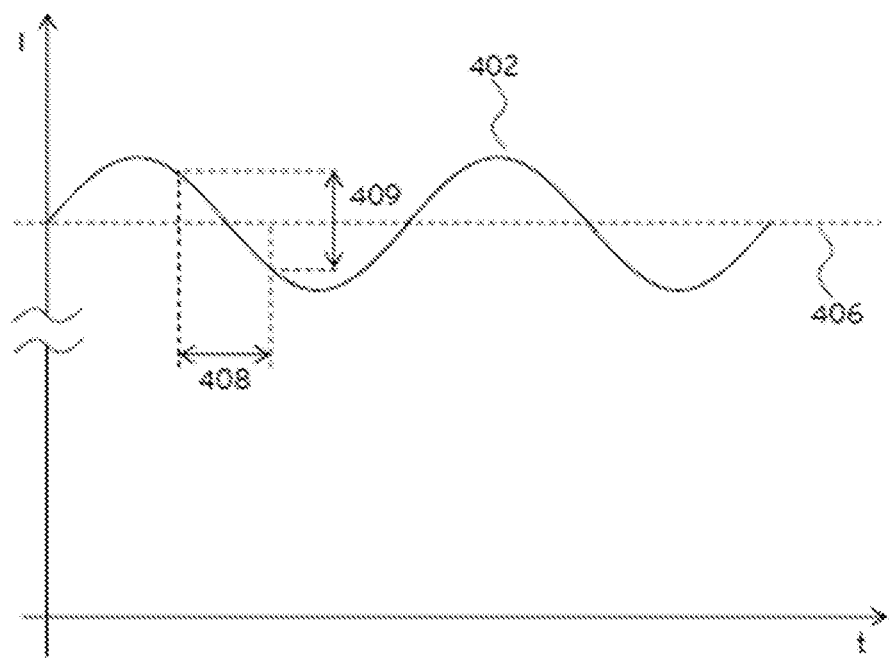

The worst case position for considering the change of ambient light is around the crossing point of curve 402 and average 406. At this point the curve 402 has its maximum slope and thus the change of the intensity over time is as its highest value. As illustrated in FIG. 4D, for example, in an interval 408, the ambient light intensity I will change by a change value 409. Assuming, for ease of description, that curve 402 is sinusoidal and that the interval 408 is symmetrical with respect to the crossing point of curve 402 and average 406, the change value 409 can be computed as twice the sinus of half interval 408.

Considering an exemplary value of 1 µs for interval 408, corresponding to 0.036° in radiant when the curve 402 has a period of 10 ms, the change value 409 is equal to 2*(sin(0.036°/2)), which corresponds to approximately 0.0628% of the alternating range 407 of curve 402. As mentioned above, the alternating range 407 can correspond, in practice, to approximately 5% of the average value 406. Thus the change value 409 is equal to 0.0628%*5%=0.00314% of the average value 406. Thus, the change can be regarded as being almost negligible with respect to the average value 406. Even if the alternating range 407 were to be more than 5% of the average value 406, assuming for instance it were 50% of the average 406, the total change 409 would be equal to 0.0628%*50%=0.0314% of the average 406, which is still negligible. It can thus be considered, for practical purposes, that an ambient light having the characteristics illustrated in FIG. 4C is stable, for short values for intervals 408, such as 1 µs or more.

Advantageously, such durations of illumination are compatible with the operation of a flash light, for instance a xenon flash light, as light source 101. In such cases then, the spectrophotometric device can operate under the assumption that the ambient light is substantially constant throughout the measurement.

Even more specifically, with exemplary reference to the spectrophotometer 300, the current generated by generator 3073 is capable of tracking the variation of the ambient light described in FIG. 4C. When the measurement begins, the tracking of the ambient light by the current generator 3073 is paused, by switching signal 3079 thus setting memory element 3077 such that it outputs the last stored value at the moment of switching of signal 3079. However, during the measurement interval 408, as described above, the ambient light does not significantly changes for values of interval 408 in the range of 1 µs to 10 µs such as 5 µs. Thus, even in the presence of a variable ambient light with characteristics similar to those described in FIG. 4C, the spectrophotometer of the present invention can advantageously provide a precise measurement, as the pulse is quick thus rendering negligible the change in ambient light after the offset value generated by the offset generator is frozen. Still further, the invention can, also in this case and as described above, advantageously operate by removing the offset due to ambient light, thus employing simpler electronics than the prior art described in FIG. 1.

In the case of longer durations for interval 408, for instance 1 ms or more, the change of ambient light 409 can however be higher. Such durations of illumination are compatible with the operation of a halogen light having a duration in the range of 50 ms to 200 ms such as 100 ms, for example. If interval 408 has a value of 1 ms, corresponding to 36° in radiant when the curve 402 has a period of 10 ms, the change value 409 is equal to 2*(sin(36°/2)), which corresponds to approximately 61.8%. As mentioned above, the alternating range 407 can correspond, in practice, to approximately 5% of the average value 406. Thus the change value 409 is equal to 61.8%*5%=3.09% of the average value 406.

Here, two situations can arise. Such change value 409 can be considered as not impacting the measurement if the intensity I2 of the light source 101 is substantially higher than the change value. Alternatively, for intensity I2 having a value in the order of 1%-10% of the average value 406, a change of ambient light of 3.09% of average value 406 may result in a significant measuring error.

In the first case, the measurement can be carried out as in the case of the flash light described above.

In the second case, however, this is not possible. If offset generator 207 is frozen during the entire interval 408, the measurement is not correct. This can simply be avoided by using an offset generator 207 described above.

Alternatively, this can also be solved by employing a measurement interval 408 having a length such that the ambient light total change is zero or substantially zero, during the interval 408. In particular, as the frequency of the ambient light source is substantially stable, as illustrated in FIG. 4C, a measuring interval 408 comprising an entire period, or a multiple thereof will result in a value of substantially zero, when integrated by integrator 3074. For instance, if the period 403 is 10 ms as described with reference to FIG. 4C, a measuring interval 408 equal to 10 ms, 20 ms, 30 ms, etc. will result in the alternating component 407 of the ambient light 402 canceling itself out in the measurement. The average 406 of the ambient light 402 will, as described above, be removed by means of offset generator 207.

In this latter case, the offset generator 207 can be advantageously configured such that it outputs a value equal to average 406, at any given time, and not a value equal to the last measured value of intensity 402, as described above in the case of the flash light as light source 101. Thanks to the presence of integrator 3074, the average 406 of signal 402 is provided to the current generator 3073, while the alternating component 407 is filtered out by the appropriate choice of the integrating period.

In further specific embodiments, the appropriate choice of the integrating period can be performed by measuring the ambient light intensity, so as to determine its frequency.

Alternatively, it can be assumed that most of the alternating component 407 of the ambient light is due to artificial illumination. Further considering that artificial light is usually powered by either 50 Hz or 60 Hz, a switch could be provided on the spectrophotometer, so as to select the appropriate frequency corresponding to the region in which the spectrophotometer is used. When 50 Hz is selected, an interval 408 having a value of 20 ms, 40 ms, etc. can be employed. Similarly, when 60 Hz is employed, an interval 408 having a value of 16.67 ms, 33.33 ms, etc. can be employed.

Advantageously, the intervals 408 so selected will also work when the alternating power supply is rectified, resulting in a frequency of, respectively, 100 Hz or 120 Hz.

Still alternatively, the spectrophotometer can deduct the local power supply frequency from its own power supply, and automatically select the corresponding interval 408, without any input from the user.

Still alternatively an interval 408 of 100 ms can be used, which results in a zero value integral for frequencies of both 50 Hz (5 periods) and 60 Hz (6 periods). Similarly, an interval 408 of 50 ms results in a zero value integral for frequencies of both 100 Hz (5 periods) and 120 Hz (6 periods).

Although in the embodiments above a flash light and halogen light have been described as light source 101, the present invention is not limited thereto. Alternatively, the light source 101 could be realized by means of a LED light, having an emission pulse duration in the range of 0.2 ms to 5 ms such as 1 ms.

It will be clear to those skilled in the art that above several distinct embodiments have been described in a distinct manner for ease of description only. In particular, different features belonging to different embodiments can be combined in an embodiment of the invention, in accordance with the scope of the claims.

The entire disclosure of all applications, patents, and publications cited above and below, especially corresponding EP 14004292.0 filed Dec. 18, 2014, are hereby incorporated by reference.

The invention claimed is:

1. A spectrophotometer, comprising:
a light source;
a light sensor for measuring the light emitted by the light source and passing through or reflected by a sample;
an analog offset generator for applying an analog offset value to an output signal of the light sensor to reduce a signal amplitude of the output signal, wherein the analog offset generator is connected directly to the light sensor; and
an analog-to-digital converter (ADC) to convert the output signal having the reduced signal amplitude into an output digital signal,
wherein the analog offset value has an absolute value corresponding to ambient light received from the environment of the spectrophotometer.

2. The spectrophotometer of claim 1, wherein the offset generator further comprises an integrator having an input connected to the light sensor.

3. The spectrophotometer of claim 2, wherein the offset generator further comprises a memory element or sample-and-hold element, and wherein an output of the integrator is connected to the memory element or sample-and-hold element.

4. The spectrophotometer of claim 3, wherein the offset generator further comprises a regulator, and wherein the output of the integrator is connected to a first input of the regulator.

5. The spectrophotometer of claim 4, wherein:
an output of the memory element or sample-and-hold element is connected to the first input of the regulator.

6. The spectrophotometer of claim 2, wherein:
the offset generator further comprises a low-pass filter and wherein the output of the integrator is connected to the low-pass filter, or
the offset generator further comprises an Analog-to-Digital converter, coupled to the integrator for converting the output of the integrator as an analog signal into a digital signal, a processor, coupled to the Analog-to-Digital converter, for processing the digital signal and calculating a digital offset signal and a Digital-to-Analog-Converter, coupled to the processor, for converting the digital offset signal into the offset value.

7. The spectrophotometer of claim 6, wherein the offset generator further comprises a regulator, and wherein the output of the integrator is connected to a first input of the regulator.

8. The spectrophotometer of claim 7 wherein an output of a low-pass filter, processor or Digital-to-Analog-Converter is connected to the first input of the regulator.

9. The spectrophotometer of claim 2, wherein the offset generator further comprises a regulator to stabilize the offset value at a predetermined value, and wherein the output of the integrator is connected to a first input of the regulator.

10. The spectrophotometer of claim 9, wherein the regulator comprises a second input, connected to an initial level signal having a predetermined level or a level input by an operator, wherein the regulator controls its output so as to minimize the difference between its two inputs.

11. The spectrophotometer of claim 2, wherein the offset generator further comprises a current generator to apply a current to the output of the light sensor, and wherein the output of the integrator is connected to the current generator.

12. The spectrophotometer of claim 11, wherein the output of the integrator is connected to the current generator through a memory element or sample-and-hold element and the regulator.

13. A method for carrying out a spectrophotometric measurement by means of a spectrophotometer comprising a light source, a light sensor, and an offset generator, the method comprising:
an ambient light evaluation step, including measuring the ambient light by means of the light sensor, with the light source being turned off or shaded off;
an offset generation step, including generating an analog offset value corresponding to the ambient light measured by the light sensor that is inputted directly to the offset generator;
a measurement step, including measuring the ambient light by means of the light sensor, while the light source is turned on or not shaded off and applying the analog offset value to an output signal of the light sensor that is directly connected to the offset generator thereby reducing a signal amplitude of the output signal; and
a converting step, including converting the output signal having the reduced signal amplitude using an analog-to-digital converter (ADC) to an output digital signal,
wherein the analog offset value has an absolute value corresponding to the ambient light from measured in the ambient light evaluation step.

* * * * *